United States Patent [19]

Ishiguro et al.

[11] Patent Number: 5,265,179
[45] Date of Patent: Nov. 23, 1993

[54] METHOD OF MANUFACTURING FIBER-OPTIC COLLIMATORS

[75] Inventors: Yoichi Ishiguro; Shigeru Hirai; Yasuji Hattori; Masayuki Nishimura, all of Yokohama, Japan

[73] Assignee: Sumitomo Electric Industries, Ltd., Osaka, Japan

[21] Appl. No.: 770,868

[22] Filed: Oct. 4, 1991

[30] Foreign Application Priority Data

Oct. 9, 1990 [JP] Japan .................. 2-269606

[51] Int. Cl.⁵ .............................. G02B 6/32
[52] U.S. Cl. .................................. 385/33
[58] Field of Search .............. 385/33, 32, 39, 52; 359/362, 642

[56] References Cited

U.S. PATENT DOCUMENTS

| | | | |
|---|---|---|---|
| 3,600,568 | 8/1971 | Weyrauch | 385/33 X |
| 4,978,190 | 12/1990 | Veith | 385/33 |
| 4,988,158 | 1/1991 | Yamamoto | 385/33 |
| 5,117,474 | 5/1992 | Vanden Bergh et al. | 385/33 X |

FOREIGN PATENT DOCUMENTS 2089061 6/1982 United Kingdom .

*Primary Examiner*—Akm E. Ullah
*Attorney, Agent, or Firm*—Sandler, Greenblum & Bernstein

[57] ABSTRACT

A method for manufacturing a fiber-optic collimator which comprises the steps of projecting a beam of light, emerging outwardly from an optical fiber, through a lens onto a planar reflecting medium so as to reflect therefrom, causing the reflected beam of light to enter the fiber through the lens, and adjusting a relationship in position between the lens and the fiber such that the intensity of the reflected beam of light entering the fiber attains a maximum value. The lens and the fiber are then fixed in position when an indication is provided that the intensity of the reflected beam of light has attained the maximum value.

5 Claims, 3 Drawing Sheets

Before Adjustment a  Fiber end
b  "Selfoc" lens end
c  "Selfoc" lens end

After Adjustment a  Fiber end
b  "Selfoc" lens end
c  "Selfoc" lens end

METHOD OF MANUFACTURING FIBER-OPTIC COLLIMATORS

BACKGROUND OF THE INVENTION

1. Field of the Invention

The present invention relates to a method of manufacturing a fiber-optic collimator for use in coupling two optical fibers together at a minimized loss.

2. Description of the Prior Art

To manufacture the fiber-optic collimator, the following three methods have generally been well known in the art.

(1) A lens holder and a fiber sleeve forming a second fiber-optic collimator is held in abutment with a first fiber-optic collimator, which has been optically adjusted on a generally V-shaped groove, and both are then fixed in position after the distance z between the lens holder and the fiber sleeve has been adjusted to minimize the coupling loss.

(2) A lens holder and a fiber sleeve forming a second fiber-optic collimator mounted on a slide adjustment is held in position so as to confront a first fiber-optic collimator which has been adjusted, and both are then fixed in position after the relative positional relationship (Axis offset: x, y; Spacing: z; and Axis tilt: $\theta$, $\phi$) between the lens holder and the fiber sleeve and, also, the relationship in position (X, Y, $\Theta$, $\Phi$) between the lens holder and the first fiber-optic collimator have been adjusted.

(3) While a lens holder and a fiber sleeve arranged in series with each other is oriented towards a screen and a light spot formed on the screen by a beam having passed through a fiber-optic collimator fixed on the lens holder is viewed from front or rear of the screen by a photographic camera, the distance z between the lens holder and the fiber sleeve is adjusted to render the diameter of the light spot to attain a minimum value and both are then fixed.

However, it has been found that any one of the foregoing prior art methods (1) to (3) have problems which will now be discussed.

According to the first-mentioned prior art method (1), the freedom of adjustment available is limited to the distance z between the lens holder and the fiber sleeve and, therefore, it is not possible to provide a low-loss fiber-optic collimator utilizing a single mode optical fiber which requires a coupling loss of, for example, not greater than 0.05 dB.

According to the second-mentioned prior art method (2), the freedom of adjustment available is limited to 5 axes and, therefore, a precise adjustment should be accomplished. However, since 4 axes are required to accomplish the adjustment in position of the first fiber-optic collimator, it is extremely difficult to locate an optimum position.

With respect to the last-mentioned prior art method (3), since a change in spot diameter of the beam on the screen is very small as compared with a change in distance between the lens holder and the fiber sleeve, not only is a strict adjustment difficult, but also the relative positional relationship between the lens holder and the fiber sleeve is not possible at all.

SUMMARY OF THE INVENTION

Accordingly, the present invention has been devised with a view to substantially eliminating the above discussed problems inherent in the prior art collimator manufacturing methods and is intended to provide an improved method that can be used to accomplish a low-loss coupling of two optical fibers together.

In order to accomplish the objective of the present invention, a method for manufacturing a fiber-optic collimator which comprises the steps of projecting a beam of light, emerging outwardly from an optical fiber, through a lens onto a planar reflecting medium so as to reflect therefrom, causing the reflected beam of light to enter the fiber through the lens, and adjusting a relationship in position between the lens and the fiber such that the intensity of the reflected beam of light entering the fiber attains a maximum value. The lens and the fiber are then fixed in position when an indication is provided that the intensity of the reflected beam of light has attained the maximum value.

According to the present invention, a beam of light emerging outwardly from an optical fiber enters the optical fiber after having been reflected by a planar reflecting medium which may be a mirror. The position of a lens relative to the optical fiber is then adjusted so that the intensity of the reflected beam of light entering the optical fiber attains a maximum value. Once this adjustment has been accomplished, the position of the lens relative to the optical fiber is fixed.

According to the adjustment method of the present invention, the freedom of adjustment is available to five axes and the adjustment of the position relative to the planar reflecting medium can be accomplished in two axes. Accordingly, the present invention is effective to accomplish a precise optical adjustment in a simplified manner.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

Embodiment 1

Figure 1:
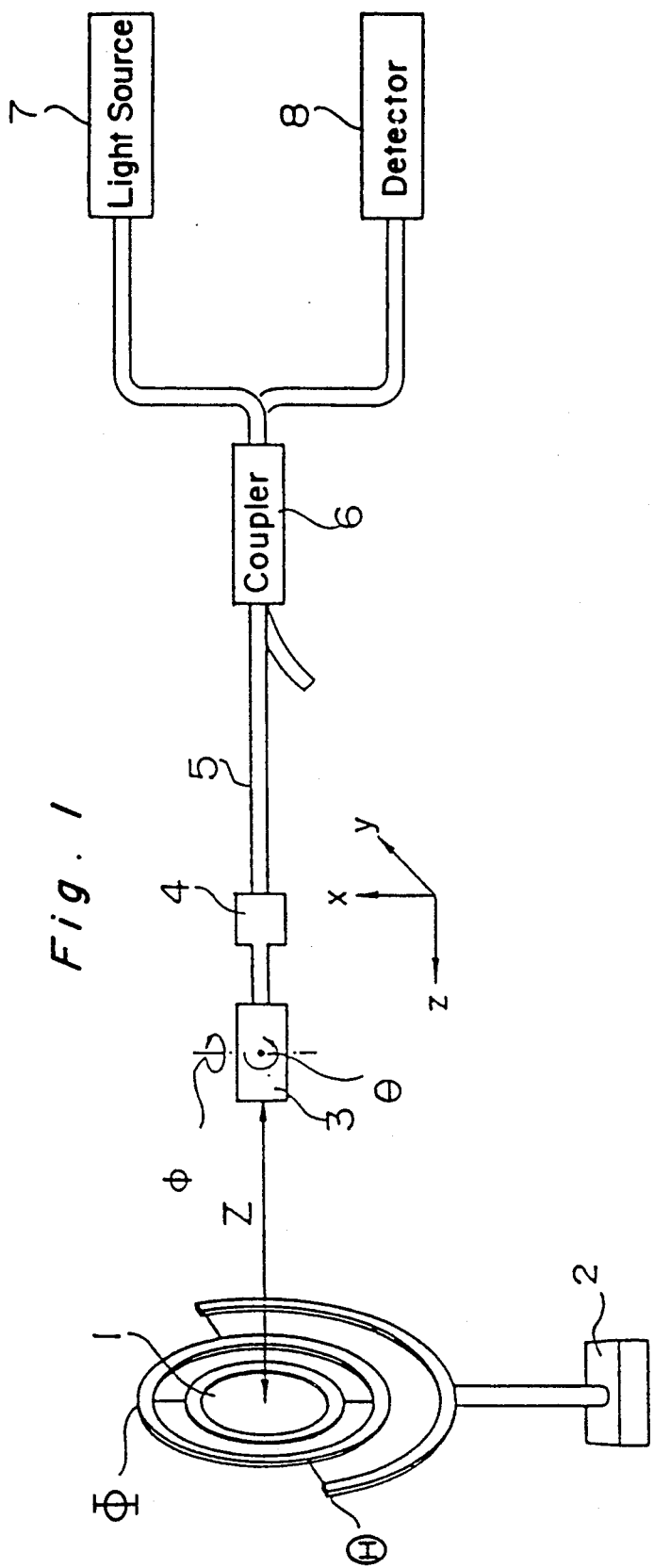
FIG. 1 is a schematic diagram showing an adjusting mechanism and a detecting system both utilizable in the practice of a method of the present invention.

Referring first to FIG. 1, there is shown an adjusting mechanism and a detecting system utilized in the practice of a method of manufacturing a fiber-optic collimator according to the present invention. In FIG. 1, reference numeral 1 represents a planar reflecting medium or mirror formed by vapor-depositing aluminum on a surface of BK-7 and having a reflectance of about 85%. This reflecting mirror 1 is supported on a support bench of a type including a rotary drive mechanism for rotating the reflecting mirror about a vertical axis $\Phi$ and also about a horizontal axis $\Theta$ perpendicular to the vertical axis $\Phi$, a reciprocating drive mechanism for driving the reflecting mirror 1 in a Z-axis direction perpendicular to any one of the vertical and horizontal axes $\Phi$ and $\Theta$, and adjusting mechanisms for the above described drive mechanisms. The reflecting mirror 1 has a center defined by the point of intersection between the vertical and horizontal axes $\Phi$ and $\Theta$ about which it turns and tilts, respectively.

Positioned a predetermined distance in the Z-axis direction from the center of the reflecting mirror 1 is a lens holder 3 made of stainless steel having front and rear ends opposite to each other, with the front end thereof oriented towards the center of the reflecting mirror 1. This lens holder 3 is supported on a support bench (not shown) of a type including a rotary drive mechanism for rotating the lens holder 3 about a vertical axis $\phi$ and also about a horizontal axis $\theta$ perpendicular to the vertical axis $\phi$. The rear end of the lens holder 3 has a fiber sleeve 4 axially slidably inserted therein. It is to be noted that the lens holder 3 has incorporated therein a fiber-bundled convergent lens which may be a bundled configuration of optical fibers sold under a trademark of "Selfoc" ®.

A single mode optical fiber 5 has a front end portion inserted into the fiber sleeve 4. The distance of separation between the convergent lens and the single mode optical fiber 5 supported by the fiber sleeve 4 is preferably chosen to be about one half the design distance of separation to be employed between two fiber-optic collimators which would eventually be manufactured. Although not shown, the fiber sleeve 4 referred to above is supported on a bench of a type equipped with a three-way reciprocating mechanism capable of driving the fiber sleeve 4 in any one of three directions, i.e., x-, y- and z-axis directions as shown.

A combination of the lens holder 3 supporting the bundled convergent lens and the fiber sleeve 4 supporting the single mode optical fiber 5 constitutes a single fiber-optic collimator.

The rear end of the single mode optical fiber 5 is, so far in the illustrated embodiment, connected with a $-3$ dB coupler 6 which is in turn connected with a source of light 7 and a photodetector 8. The light source 7 may be constituted by a light emitting diode of a type capable of emitting rays of light of, for example, 1.55 $\mu$m in wavelength.

In the construction described hereinbefore, a beam of light having a wavelength of 1.55 $\mu$m and about $-4$ dBm, which is emitted from the light source 7 is transmitted through the coupler 6 to the single mode optical fiber 5. The light beam entering the single mode optical fiber 5 is converged by the lens and is subsequently projected onto the reflecting mirror 1. A beam of light reflected from the reflecting mirror 1 passes again through the lens and enters the single mode optical fiber 5. The reflected light beam entering the optical fiber 5 is subsequently guided through the coupler 6 to the photodetector 8.

In the practice of the present invention, the distance between the reflecting mirror 1 and the lens holder 3 was chosen to be 10 mm and the position of the reflecting mirror 1 about any one of the vertical and horizontal axes $\Phi$ and $\Theta$, the position of the lens holder 3 about any one of the vertical and horizontal axes $\phi$ and $\theta$ and the position of the fiber sleeve 4 in any one of the x-, y- and z-directions were adjusted to such an extent that the photodetector 8 provided a reading of $-10.5$ dB. Since the reflecting mirror 1 has a reflectance of about 85%, a substantially total quantity of the light beam emitted from the optical fiber 5 is reflected back towards the optical fiber 5.

After this adjustment, the lens holder and the optical fiber 5 were fixed in position by the use of any known UV-curable resin, thereby to complete a single fiber-optic collimator.

Figure 2:
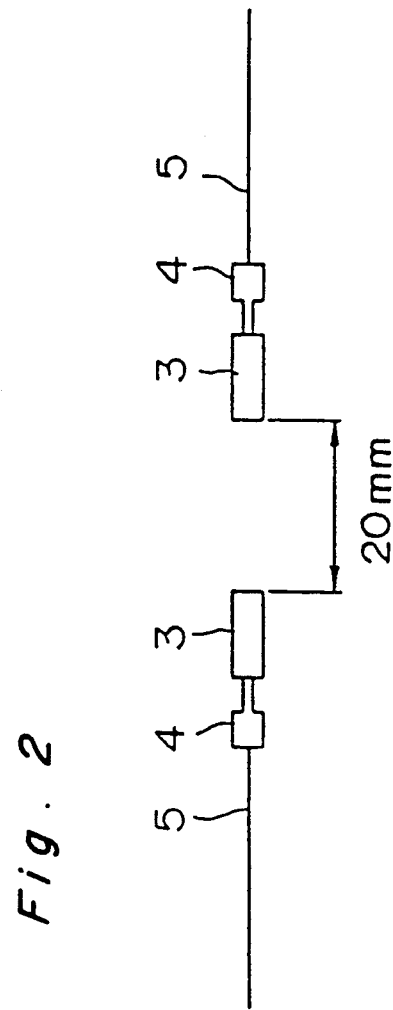
FIG. 2 is a schematic diagram showing two fiber-optic collimators obtained by the method of the present invention and spaced at a distance from each other.

Two fiber-optical collimators each being of the construction described above were placed with the respective lens holders 3 spaced a distance of 20 mm as shown in FIG. 2, and a coupling loss was measured. The measurement indicated that the coupling loss was very small of $-0.1$ dB.

Embodiment 2

Using an adjusting mechanism of a construction similar to that used in the Embodiment 1, but with an optical time domain reflectometer (OTDR) employed in place of the photodetector, two fiber-optic collimators were manufactured.

Figure 3:
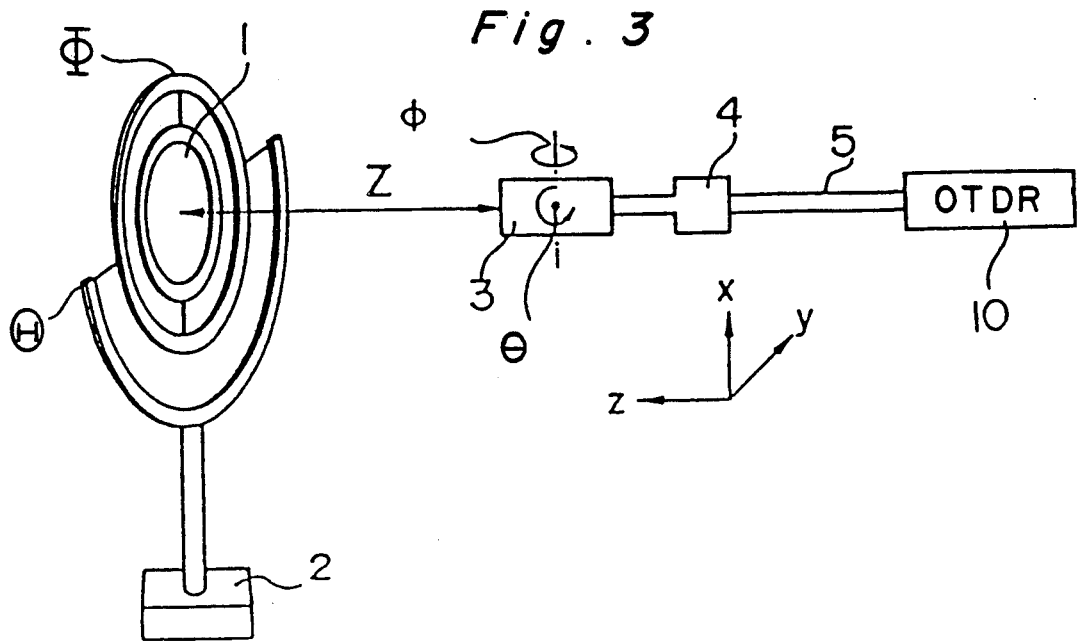
FIG. 3 is a schematic diagram similar to FIG. 1, showing another embodiment of the present invention in which OTDR (Optical Time Domain Reflectometer) is employed for the detecting system.
Figure 4:
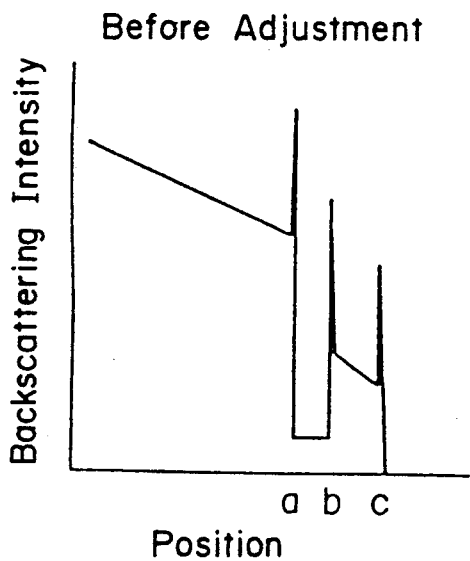
FIG. 4 is a graph showing the intensity of backscattering before adjustment accomplished by the use of the adjusting mechanism of FIG. 3.
Figure 5:
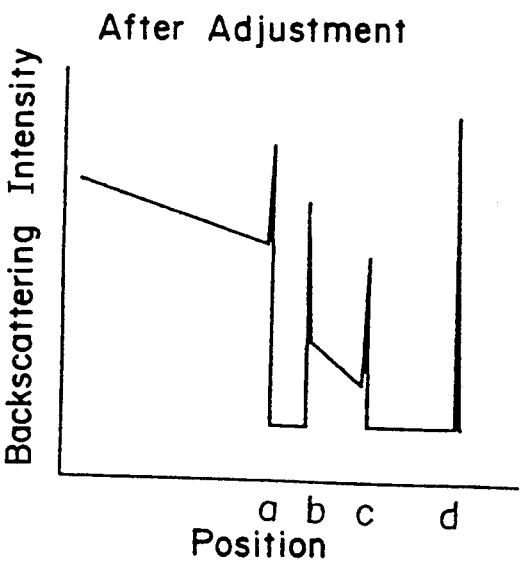
FIG. 5 is a graph similar to FIG. 4, showing the intensity of backscattering after the adjustment.

Referring now to FIG. 3, reference numeral 10 represents an OTDR. In this example, while viewing a picture displayed by the OTDR, the position of the reflecting mirror 1 about any one of the vertical and horizontal axes $\Phi$ and $\Theta$, the position of the lens holder 3 about any one of the vertical and horizontal axes $\phi$ and $\theta$ and the position of the fiber sleeve 4 in any one of the x-, y- and z-directions were adjusted so that the backscattering intensity of the reflected beam from the reflecting mirror 1 can be maximized. The backscattering intensity before this adjustment and that after this adjustment are shown in FIGS. 4 and 5, respectively.

After this adjustment, the lens holder and the optical fiber 5 were fixed in position with the use of any known YAG laser welding apparatus, thereby to complete a single fiber-optic collimator. Two fiber-optic collimators each being of the construction described above were placed with the respective lens holders 3 spaced a distance of 20 mm as shown in FIG. 2, and a measurement of the coupling loss indicated that the coupling loss was very small, on the order of $-0.1$ dB.

Since OTDR 10 is employed in the detecting system under the Embodiment 2, the reflected beam of light from the end of the optical fiber, which would constitute a background noise at the time of a detection of the incident light entering the optical fiber, can be isolated and, therefore, it is possible to accomplish a strict and precise optical adjustment.

Embodiment 3

Using the adjusting mechanism similar to that under Embodiment 1, but in which a piezoelectric element is bonded to a rear surface of the reflecting mirror 1, an observation of that output from the detector on an oscilloscope display which was obtained when the reflecting mirror 1 was oscillated in the Z-axis direction at a frequency of 1 kHz and an amplitude of 1 $\mu$m showed the presence of a component of 1 kHz in frequency. Based on this result of observation, it could be determined that an interference occurred between the beam of light reflected from the reflecting mirror 1 and the beam of light reflected from the end of the optical fiber, and therefore, the position of the reflecting mirror 1 about any one of the vertical and horizontal axes Φ and Θ, the position of the lens holder 3 about any one of the vertical and horizontal axes φ and θ and the position of the fiber sleeve 4 in any one of the x-, y- and z-directions were adjusted to such an extent that a signal obtained by extracting only a component of 1 kHz in frequency by means of a lock-in detecting technique could be maximized.

After this adjustment, the lens holder and the optical fiber 5 were fixed in position, thereby to complete a single fiber-optic collimator. Two fiber-optic collimators each being of the construction described above were placed with the respective lens holders 3 spaced a distance of 20 mm as shown in FIG. 2, and a measurement of the coupling loss indicated that the coupling loss was very small, on the order of −0.1 dB.

According to Embodiment 3, since the position of the reflecting mirror 1 is finely oscillated to modulate the beam of light incident on the single mode optical fiber 5 so that the incident beam of light can be detected by the lock-in technique, the beam of light reflected from the reflecting mirror 1 can be isolated and extracted and, therefore, it is possible to accomplish the optical adjustment easily.

Embodiment 4

Figure 6:
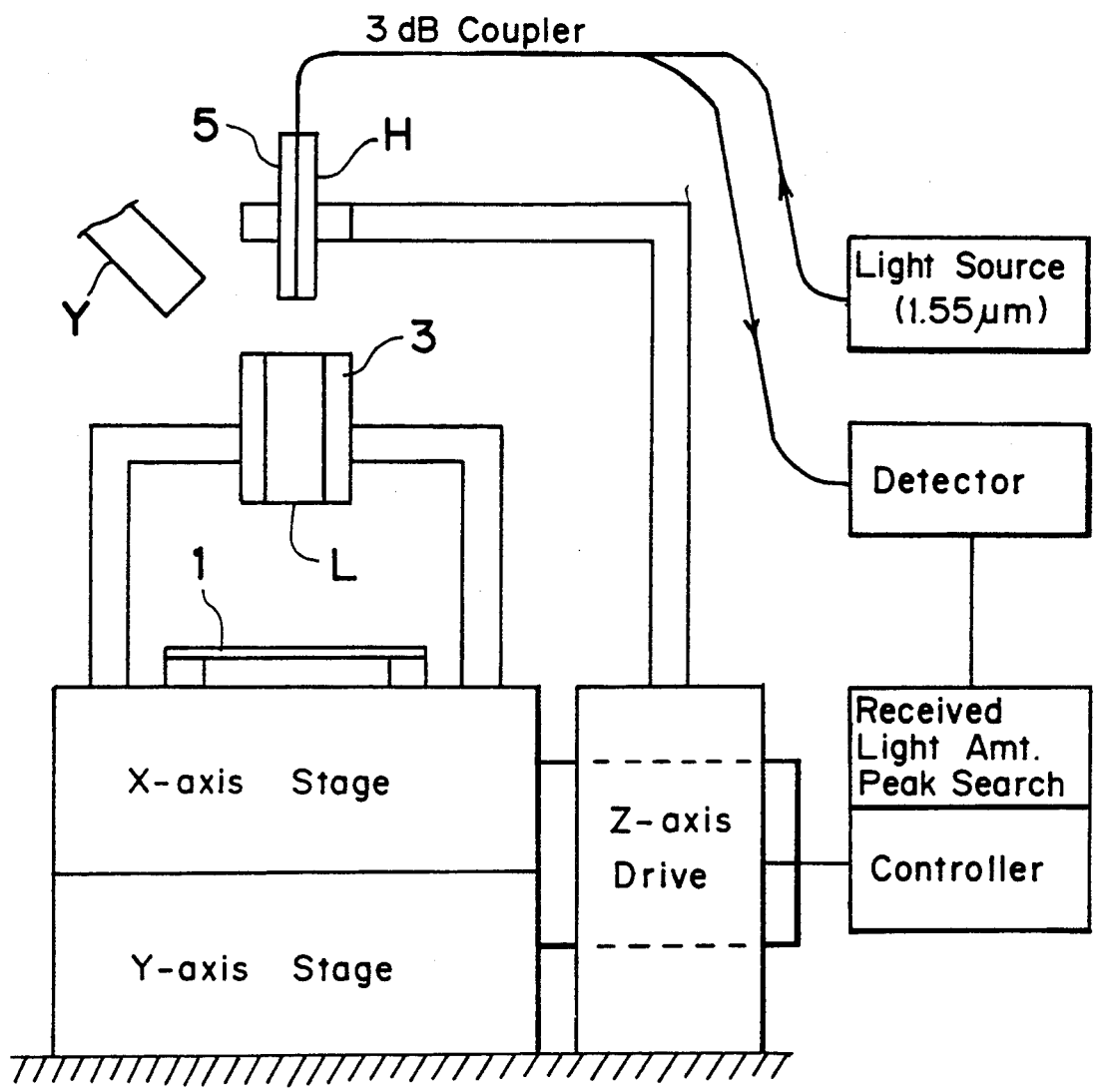
FIG. 6 is a schematic diagram showing a collimator set-up machine used in the practice of a different embodiment of the present invention.

Referring to FIG. 6, the single mode optical fiber 5 is held in position by a fiber holder H and has a free end ground slantwise at an angle of 8° and is then applied with a multi-layered anti-reflection coating effective to avoid a reflection of rays of light of 1.55 μm in wavelength. On the other hand, the fiber-bundled convergent lens L similar to that used in Embodiment 1 is accommodated in the lens holder 3. Lens holder 3, is, for example, made of metal. These two parts are then set on a fiber collimator set-up device shown in FIG. 6.

The lens holder 3 is supported for movement in an X-axis direction and also in a Y-axis direction by means of X-axis and Y-axis stages, respectively, while the fiber holder H is supported for movement up and down, i.e., in a Z-axis direction by means of a Z-axis drive.

Rays of light of 1.55 μm is wavelength are passed through the convergent lens L and towards the mirror 1. The light reflected from the mirror 1 enters the optical fiber 5 through the convergent lens L. The reflected light is then transmitted to a detector by means of a 3 db coupler. The amount of the reflected light detected by the detector for any particular position of the optical fiber 5 relative to the convergent lens L is processed according to and by a received light amount peak search software, i.e., a software designed to search for the peak value of the amount of the reflected light for each particular position, and subsequently, both of the convergent lens L and the single mode optical fiber are moved to respective positions at which the amount of the reflected light can be maximized.

Thereafter, the fiber holder H and the lens holder 3 are fixedly welded together by means of a YAG laser Y thereby to provide a fiber collimator.

Evaluation of the insertion loss measured by positioning the two fiber collimators each manufactured under this Embodiment in opposed fashion to each other has indicated that the loss was low, on the order of 0.3 dB.

Thus, according to the present invention, the position of one of the lens and the optical fiber relative to the other of the lens and the optical fiber is adjusted and then fixed so that the beam of light which has emerged outwardly from the optical fiber and reflected back towards the optical fiber by the planar reflecting medium can be maximized. Therefore, the present invention is effective to accomplish a precise and simplified optical adjustment to provide the fiber-optic collimator which can be utilized to couple two optical fibers together at a reduced loss.

While the present invention has fully been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for manufacturing a fiber-optic collimator which comprises the steps of:
   projecting a beam of light, emerging outwardly from an optical fiber, through a lens onto a planar reflecting medium so as to reflect therefrom;
   causing the reflected beam of light to enter the fiber through the lens;
   adjusting a position of one of the lens and the fiber relative to the other of the lens and the fiber such that the intensity of the reflected beam of light entering the fiber attains a maximum value; and
   fixing the lens and the fiber in position when an indication is provided that the intensity of the reflected beam of light has attained the maximum value, wherein said fixing the lens and optical fiber in position comprises welding by YAG laser.

2. A method for manufacturing a fiber-optic collimator which comprises the steps of:
   projecting a beam of light, emerging outwardly from an optical fiber, through a lens onto a planar reflecting medium so as to reflect therefrom;
   causing the reflected beam of light to enter the fiber through the lens;
   providing a 3 dB coupler between a light source and the optical fiber;
   adjusting a position of one of the lens and the fiber relative to the other of the lens and the fiber such that the intensity of the reflected beam of light entering the fiber attains a maximum value; and
   fixing the lens and the fiber in position when an indication is provided that the intensity of the reflected beam of light has attained the maximum value.

3. A method for manufacturing a fiber-optic collimator which comprises the steps of:
   projecting a beam of light, emerging outwardly from an optical fiber, through a lens onto a planar reflecting medium so as to reflect therefrom;
   causing the reflected beam of light to enter the fiber through the lens;
   adjusting a position of one of the lens and the fiber relative to the other of the lens and the fiber such that the intensity of the reflected beam of light entering the fiber attains a maximum value; and
   fixing the lens and the fiber in position when an indication is provided that the intensity of the reflected beam of light has attained the maximum value; further comprising providing an optical time domain reflectometer at one end of the optical fiber opposite the lens, for adjusting the backscattering intensity reflected through the optical fiber.

4. A method for manufacturing a fiber-optic collimator which comprises the steps of:

projecting a beam of light, emerging outwardly from an optical fiber, through a lens onto a planar reflecting medium so as to reflect therefrom;

causing the reflected beam of light to enter the fiber through the lens;

adjusting a position of one of the lens and the fiber relative to the other of the lens and the fiber such that the intensity of the reflected beam of light entering the fiber attains a maximum value; and fixing the lens and the fiber in position when an indication is provided that the intensity of the reflected beam of light has attained the maximum value; further comprising providing a piezoelectric element on a rear surface of the planar reflecting medium to allow observation, by oscilloscope, of the light contacting the planar reflecting medium.

5. A method for manufacturing a fiber-optic collimator which comprises the steps of:

projecting a beam of light, emerging outwardly from an optical fiber, through a lens onto a planar reflecting medium so as to reflect therefrom;

causing the reflected beam of light to enter the fiber through the lens;

adjusting a position of one of the lens and the fiber relative to the other of the lens and the fiber such that the intensity of the reflected beam of light entering the fiber attains a maximum value; and fixing the lens and the fiber in position when an indication is provided that the intensity of the reflected beam of light has attained the maximum value; further comprising supporting the lens for movement along two perpendicular axes while supporting the fiber for movement along a third axis perpendicular to each of the two axes along which the lens is supported to move along.

* * * * *